(12) United States Patent
Johnson et al.

(10) Patent No.: US 10,295,212 B2
(45) Date of Patent: May 21, 2019

(54) LOAD CONTROL SYSTEM AND METHOD FOR REGULATING POWER SUPPLY TO A THERMOSTAT

(71) Applicant: Cooper Technologies Company, Houston, TX (US)

(72) Inventors: Justin Bruce Johnson, Plymouth, MN (US); Karl Andrew Slingsby, Minneapolis, MN (US); Timothy Daniel Masters, Plymouth, MN (US); Ryan F. Brager, Maple Grove, MN (US)

(73) Assignee: Eaton Intelligent Power Limited, Dublin (IE)

( * ) Notice: Subject to any disclaimer, the term of this patent is extended or adjusted under 35 U.S.C. 154(b) by 256 days.

(21) Appl. No.: 15/228,054

(22) Filed: Aug. 4, 2016

(65) Prior Publication Data
US 2018/0038607 A1 Feb. 8, 2018

(51) Int. Cl.
| F24F 11/00 | (2018.01) |
| F24F 11/30 | (2018.01) |
| F24F 11/62 | (2018.01) |
| G05D 23/19 | (2006.01) |
| F24F 140/60 | (2018.01) |
| F24F 140/50 | (2018.01) |
| F24F 11/46 | (2018.01) |
| F24F 110/00 | (2018.01) |

(52) U.S. Cl.
CPC .............. *F24F 11/30* (2018.01); *F24F 11/62* (2018.01); *G05D 23/19* (2013.01); *F24F 11/46* (2018.01); *F24F 2110/00* (2018.01); *F24F 2140/50* (2018.01); *F24F 2140/60* (2018.01); *G05B 2219/2614* (2013.01)

(58) Field of Classification Search
CPC .. F24F 11/30; F24F 11/46; F24F 11/62; F24F 2110/00; F24F 2140/50; F24F 2140/60; G05B 2219/2614; G05D 23/19
See application file for complete search history.

(56) References Cited

U.S. PATENT DOCUMENTS

| 4,027,171 A | 5/1977 | Browder et al. |
| 4,402,059 A * | 8/1983 | Kennon ................. G01R 21/00 713/300 |
| 5,566,879 A | 10/1996 | Longtin |

(Continued)

FOREIGN PATENT DOCUMENTS

CN 203299668 U 11/2013

*Primary Examiner* — Abdelmoniem I Elamin
(74) *Attorney, Agent, or Firm* — Ziolkowski Patent Solutions Group, SC

(57) ABSTRACT

A system for controlling a load control relay (LCR) supplying power to a thermostat of a heating, ventilating, and air conditioning (HVAC) system includes a controller programmed to maximize the amount of time that a load of the HVAC system may receive power. The controller operates by measuring a thermostat delay time of the thermostat and modifying cycle shed and restore times for controlling the LCR based on the measured thermostat delay time. By controlling the LCR according to the modified cycle shed and restore times, the controller compensates for the thermostat delay time, and the load is able to be active for a longer period of time than it otherwise would be when operating under demand-response controls.

20 Claims, 4 Drawing Sheets

(56) References Cited

U.S. PATENT DOCUMENTS

| | | | |
|---|---|---|---|
| 6,119,950 A | 9/2000 | Albanello et al. | |
| 6,480,803 B1* | 11/2002 | Pierret | G05D 23/1904 307/39 |
| 8,870,086 B2* | 10/2014 | Tessier | F24F 11/006 236/51 |
| 9,342,062 B2* | 5/2016 | Allmaras | G05B 15/02 |
| 2005/0150651 A1 | 7/2005 | Halsey | |
| 2008/0011864 A1* | 1/2008 | Tessier | F24F 11/006 236/51 |
| 2009/0187499 A1* | 7/2009 | Mulder | G05B 15/02 705/30 |
| 2012/0053745 A1 | 3/2012 | Ng | |
| 2012/0158196 A1* | 6/2012 | Eldershaw | H02J 3/381 700/287 |
| 2013/0125572 A1* | 5/2013 | Childs | F25B 49/022 62/126 |
| 2014/0096946 A1 | 4/2014 | Rognli et al. | |
| 2014/0111006 A1* | 4/2014 | Baldassarre | H02J 9/002 307/23 |

\* cited by examiner

LOAD CONTROL SYSTEM AND METHOD FOR REGULATING POWER SUPPLY TO A THERMOSTAT

BACKGROUND OF THE INVENTION

The present invention relates generally to heating, ventilating, and air conditioning (HVAC) controls systems and, more particularly, to a system and method for compensating for thermostat delays in activating HVAC systems.

Electric utility companies need to generate enough power to supply the various loads currently demanding power. Traditionally, utilities meet the load demand using automated generation control. The load demand may rise and fall dramatically throughout the day, and the overall load demand generally rises every year. As loads are added to utility grids and demand rises, utilities increase the output of existing generators to meet the increased demand. To solve the issue of continuing long-term demand, utilities typically invest in additional generators and plants to match rising demand. As load levels fall, utilities may reduce generator output or even take generators off line to match falling demand. As the overall demand for electricity grows, the cost to add power plants and generation equipment that serve only to fill peak demand becomes extremely costly.

In response to the high cost of peaking plants, electric utility companies have developed solutions and incentives aimed at reducing both commercial and residential demand for electricity. In the case of office buildings, factories and other commercial buildings having relatively large-scale individual loads, utilities offer differential electricity rates to consumers who install locally-controlled load-management systems that reduce on-site demand. Reduction of any individual large scale loads by such load-management systems may significantly impact overall demand on its connected grid. In the case of individual residences having relatively small-scale electrical loads, utilities offer pricing incentives to consumers who install demand-response (DR) technology at their residences. The DR technology controls high-usage appliances such as, for example, air-conditioning (AC) compressors, water heaters, pool heaters, and so on. Such technology aids the utilities in easing demand during sustained periods of peak usage.

Traditional DR technology used to manage thermostatically-controlled loads such as AC compressors typically consists of a DR thermostat or a load control relay (LCR). Such DR thermostats, LCRs, and other known DR devices are designed to be used with a wide variety of ducted, thermostatically-controlled HVAC systems such as, for example, those commonly used in single-family residences in the United States. Typical ducted HVAC systems in the United States utilize distinct and separate thermostatic devices, circulation fan controls, electrical contactors, switches, and so on that are easily accessible for connection to DR devices.

When an LCR is selected as the DR device, the LCR is typically added to an existing HVAC system. The LCR is often wired into the HVAC system to control the R wire (power wire) to a thermostat, interrupting power to the thermostat when a load or loads of an HVAC system are to be controlled. Interrupting power to the thermostat is often referred to as shedding the load or shedding the LCR and occurs when the LCR is in an open position or state. In contrast, closing the LCR to supply power back to the thermostat is often referred to as restoring the LCR, as power is restored to the thermostat once the LCR is closed. The LCR is typically controlled according to a cycle or shed percentage indicating the percentage of time in a cycle that the LCR should be shed or according to a restore percentage indicating the percentage of time in a cycle that the LCR should be restored.

Many thermostats include an integrated protection timer that delays providing power to the HVAC system loads for a certain amount of time after the LCR has restored power to the thermostat. For example, once an LCR has restored power to a thermostat that is configured to supply power to a Y wire (a call for cool line or cool control line) running to an air conditioner, the thermostat will not supply power to the Y wire until a protection timer has expired. The thermostat or compressor protection delay implemented by the protection timer may be configurable (different from home owner to home owner). But, most often, the protection timer uses a randomized thermostat protection delay so that, if power is restored after a power failure, a utility grid will not experience the combined demand of all the loads that come back online after power has been restored instantaneously.

While the thermostat protection timers provide certain benefits to the utility, property owners experience periods of load shed that are longer than required to receive the lower prices offered by the utilities under the DR system, and those extended periods of load shed cause those property owners to experience greater discomfort. More specifically, the LCR controls are configured assuming that the thermostat provides power to its loads immediately after the LCR is closed. However, the thermostat will not allow any loads to receive power during the thermostat protection delay period, even though the LCR is closed. Thus, from a property owner's perspective, the period when the LCR is restored and the thermostat will not relay power to its load(s) is wasted control time.

It would therefore be desirable to provide a system and method for compensating for the thermostat protection delay time in order to maximize the control period when the LCR is restored.

BRIEF DESCRIPTION OF THE INVENTION

Embodiments of the present invention provide a system and method for compensating for thermostat delays in order to maximize the time that loads of an HVAC system operating within a DR system receive power from a utility.

In accordance with one aspect of the invention, a system for controlling a load control relay (LCR) for a heating, ventilating, and air conditioning (HVAC) system includes a controller. The controller is programmed to measure a thermostat delay time of a thermostat of the HVAC system, the thermostat delay time including an amount of time between restoring the LCR and receiving power in a load control line coupled between the thermostat and a load of the HVAC system. The controller is further programmed to calculate a new cycle shed time and a new cycle restore time based on the measured thermostat delay time, wherein the new cycle shed time and the new cycle restore time compensate for the thermostat delay time. The controller is also programmed to control the LCR according to the new cycle shed time and new cycle restore time.

In accordance with another aspect of the invention, a method of controlling a load control relay (LCR) for a heating, ventilating, and air conditioning (HVAC) system having a thermostat and a load control line coupling the thermostat to a load includes measuring a thermostat-induced delay between a time the LCR is restored and a time power is received on the load control line. The method additionally includes defining a compensation time to offset the thermostat-induced delay and calculating a new cycle shed time and a new cycle restore time based on the compensation time. The method further includes controlling the LCR according to the new cycle shed time and the new cycle restore time.

In accordance with yet another aspect of the invention, a load control system for selectively supplying power to a thermostat of a heating, ventilating, and air conditioning (HVAC) system includes a load control relay (LCR) coupleable to the HVAC system. The load control system also includes a sensor configured to sense whether a load control line for a load of the HVAC system is active. The load control system additionally includes a communication system capable of communicating with a master station to receive a control command including a shed percentage and one of a control duration and a cycle period for controlling the LCR. The load control system further includes a controller for selectively controlling the LCR according to the control command. The controller programmed to calculate a cycle shed time and a cycle restore time based on the control command and 1 control the LCR according to the cycle shed time and the cycle restore time. In addition, the controller is programmed to determine a thermostat delay between a restore time of the LCR and a time the sensor senses that the load control line is active and modify the cycle shed time and the cycle restore time based on the thermostat delay to counteract the thermostat delay. Furthermore, the controller is programmed to control the LCR according to the modified cycle shed time and the modified cycle restore time.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a load control system and method for regulating power supply to a thermostat that compensates for delays introduced by thermostats in HVAC systems, thereby maximizing the time that HVAC loads receive power under a demand response regime. Embodiments of the system and method disclosed herein differ from prior art systems by modifying the commanded cycle percentage for an LCR of an HVAC system after monitoring how the HVAC system operates under the commanded cycle percentage rather than using the commanded cycle percentage without regard to how the HVAC system is actually operating under that command. As described in detail below, embodiments of the invention include a controller that is programmed to initially control the LCR based on cycle shed time and a cycle restore time calculated from the commanded cycle percentage. The controller determines a thermostat delay time between restoring the LCR and receiving power on a load control line running from a thermostat of the HVAC system to a load of the HVAC system. The controller next modifies the cycle shed and restore times to compensate for the delays caused by the thermostat. The controller then operates the LCR based on the modified cycle shed and restore times to meet the control command and maximize the amount of time that the load control line can be active.

Figure 1:
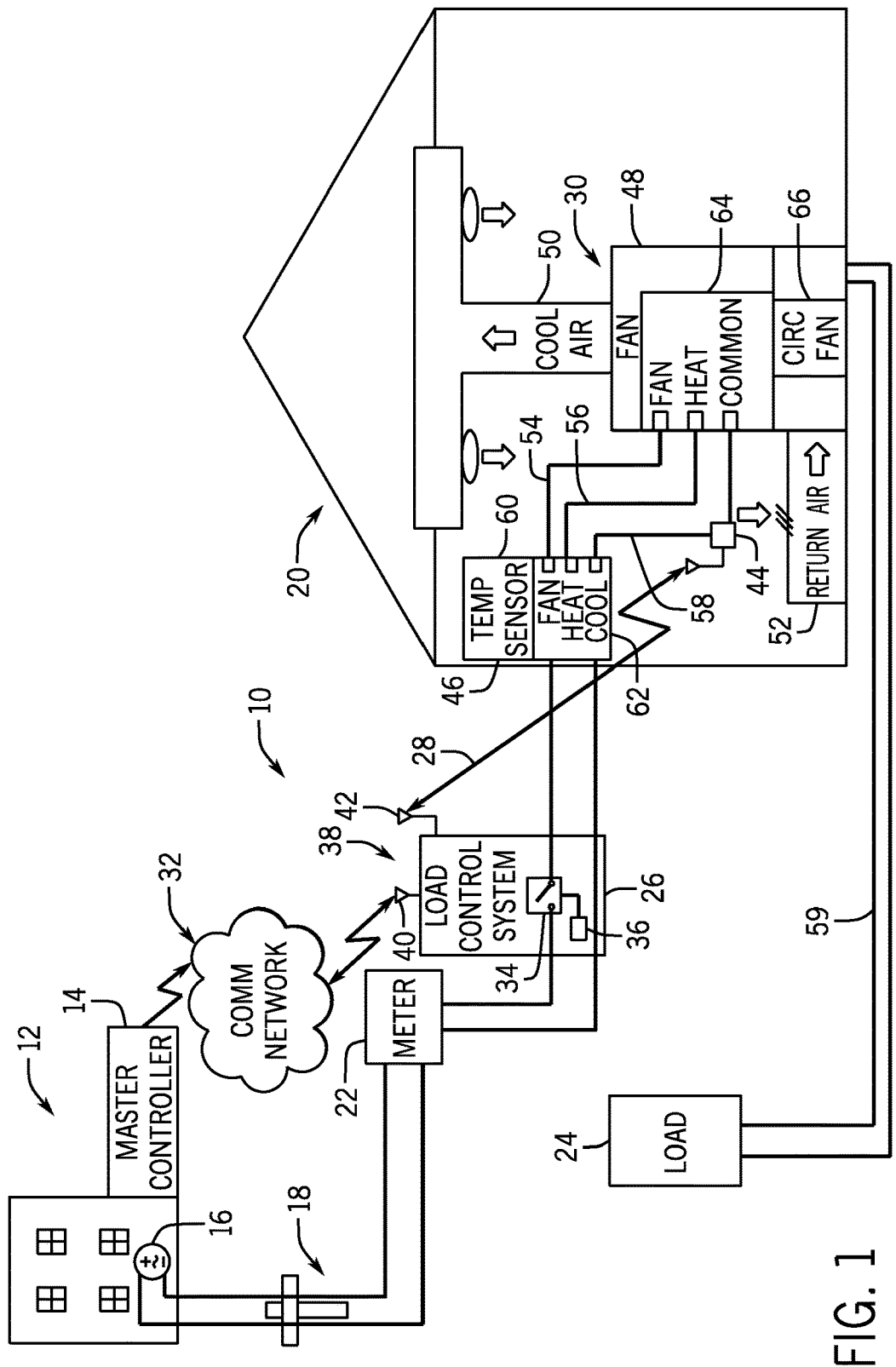
FIG. 1 is a diagram of an electrical system, according to an embodiment of the invention.

Referring to FIG. 1, a diagram of an electrical system 10 is illustrated, according to an embodiment of the invention. The electrical system 10 includes a master station 12 of an electrical utility having a master controller 14 and an electrical power source 16. The electrical power source 16 may include one or more power-generating facilities such as, for example, fossil fuel hydro-electric, and nuclear power plants. The electrical system 10 also includes a power distribution network 18 electrically connecting the master station 12 to building or facility 20 such as, for example, a residence, an office, or any other building that receives power from an electrical utility. The facility 20 includes a power meter 22, an electrical load 24, a load control system 26, a local or short-haul communications system or network 28, and an HVAC system 30. Electricity enters the facility 20 through the power meter 22 and is then distributed to various circuits with the facility 20 according to the control of the load control system 26. The electrical load 24 may include any electricity-consuming device, but is generally a high-energy usage device such as, for example, a compressor, a hot water heater, or a pool heater. The local communications system network 28 may utilize such communications as, for example, ZigBee®, Bluetooth®, WiFi®, and various Internet Protocol-based communications protocols. In various embodiments, the local communications system 28 is a wired link instead of a wireless link.

In the illustrated embodiment, the master station 12 communicates directly with the load control system 26 via a long-haul communications network 32 formed therebetween. Alternatively, the long-haul communications network 32 may be configured to communicate with the load control system 26 via power meter 22 in embodiments where power meter 22 is a smart meter with communications abilities. The long-haul communications network 32 may include a wireless network, as depicted in FIG. 1, or a wired network and may have one-way or two-communications ability. If the long-haul communications network 32 is a one-way network, the master station 12 transmits load-control or load-shedding messages and commands to the load control system 26 without receiving any communications back from the load control system 26. If the long-haul communications network 32 is a two-way network, the master station 12 transmits the same or similar messages and commands and also receives data from the load control system 26. The long-haul communications network 32 may use wired or wireless communications, telephonic communications, Internet Protocol-based communications, satellite system-based communications, and any other type of communications useful for communicating with the load control system 26. Examples of such communications systems include 900 MHz FLEX Paging, 154 MHz VHF Paging, ZigBee®, wireless mesh network, and Power Line Carrier.

The load control system 26 includes an load control relay (LCR) 34 or load control switch, a controller or control system 36 coupled to the LCR 34, a communications system 38 including two receivers 40, 42 and a load control line sensor 44 in communication with the load control system 26 via local communications system 28 and receiver 42. In various embodiments when the long-haul communications network 32 is a two-way network, the receiver 40 may be a transceiver. The LCR 34 is illustrated as a single-pole, single-throw relay. However, in various embodiments, the LCR 34 may include more than one relay for controlling multiple facilities or may be another type of switching device in the form of known relays, switching circuits or modules configured and/or programmed to interrupt a control or power line. The LCR 34 may be closed or restored to allow power to flow from the power meter 22 to the facility 20. The LCR 34 may also be opened or shed to disable power from flowing between the power meter 22 and the facility 20. The LCR 34 is controlled by the controller 36 according to communications received from the master station 12 via long-haul communications network 32. In various embodiments, the load control line sensor 44 is electrically connected to the controller 36 via the local communications system 28 as a wired link, and the controller 36 and the load control line sensor 44 together act as a current detection circuit.

The HVAC system 30 includes a thermostat 46, a forced-air unit (FAU) 48, a conditioned-air or supply ducting 50, and a return-air ducting 52. The thermostat 46 is communicatively coupled to FAU 48 and the load control system 26. The thermostat 46 is coupled to the FAU 48 over three load control lines: a FAN control line 54, a HEAT control line 56, and a COOL control line or Y wire 58. As shown, the load control line sensor 44 of the load control system 26 is a current sensor positioned to sense whether the COOL control line 58 is actively receiving power. The load control line sensor 44 is in communication with the load control system 26 via the local communications system 28 and receiver 40. In some embodiments, the load control line sensor 44 may be on the FAN control line 54 or the HEAT control 56 or two or all of the load control lines 54, 56, 58 may include a load control line sensor 40 for sensing when each respective load control line 54, 56, 58 is active. In some other embodiments, the load control line sensor 44 is positioned on wire 59 between the electrical load 24 and the HVAC system 30. In various other embodiments, the load control line sensor 44 may be a different type of sensor such as, for example, a voltage sensor.

As stated above, in order to control the load control system 26, the master station 12 sends communications to the load control system 26 via the long-haul communications network 32. These communications include a control command that typically contains a time to begin controlling the LCR 34, a number of cycles to control the LCR 34, and a cycle period for each cycle. The control command also includes at least one of a cycle or shed percentage and a restore percentage. If the control command only includes one of the shed percentage and the restore percentage, the other can be calculated, as the shed percentage plus the restore percentage equals 100%. A shed time or period for each cycle can be calculated by multiplying the cycle percentage by the cycle period. A restore time or period for each cycle can be calculated by multiplying the restore percentage by the cycle period.

When the LCR 34 is shed according to a load-shedding or load-control event according to the control command from the master station 12, the thermostat 46 of the HVAC system 30 will not receive power. When the LCR 34 is restored, the thermostat 46 operates under its normal operating conditions, but only after a thermostat or protection delay or delay time has elapsed. The duration of this thermostat-induced delay may be variable or randomized to protect the master station 12 from receiving too much load demand at one time after power is restored at the end of a power outage. Controller 36 of LCR 34 includes an internal memory in which is stored software or firmware in the form of a load control algorithm that causes the controller 36 to modify the control command received from the master station 12 based on readings received from the load control line sensor 44 via local communications system 28 to compensate for the thermostat delay. Thus, controller 36 is programmed with software to carry out techniques for controlling the LCR 34 according to the readings of the load control line sensor 44, as will be discussed in greater detail below with reference to FIGS. 3-4.

The thermostat 46 includes a temperature sensor 60 and a thermostat controller 62. The thermostat 46 will generally be located within a conditioned space of the facility 20 and will be accessible to a user. The FAU 48 includes an FAU controller 64 coupled to the thermostat controller 62 via the load control lines 54, 56, 58 and a circulation fan 66. The FAU 48 is also coupled to the supply ducting 50, the return-air ducting 52, and the electrical load 24.

The temperature sensor 60 and the thermostat controller 62 may be integrated into a single unit so that the temperature sensor 60 senses the temperature at the location of the thermostat 46. In various embodiments, the temperature sensor 60 may be located at a separate location that the thermostat 46 and then would be in communication with the thermostat controller 62. In various other embodiments, the thermostat 46 may include any number of known temperature-control devices. The thermostat 46 may be, for example, a programmable, a non-programmable, a digital, a mechanical, or a communicative thermostat. The thermostat 46 may operate on 24 volts of alternating current, line voltage, or any other compatible voltage. Under normal operating conditions when the load control system 26 is not being controlled according to a load-shedding event, the thermostat 42 of the HVAC system 30 operates to maintain an approximately constant temperature within the conditioned space of the facility 20.

According to the normal operation of the thermostat 46 when the electrical load 24 is a cooling device, such as, for example, a compressor for an air conditioner, the temperature sensor 60 senses a space temperature of the facility 20 and communicates that temperature to the thermostat controller 62. The thermostat controller 62 compares the sensed space temperature to a temperature set point stored in a memory (not shown) of the thermostat controller 62. If the sensed space temperature is above the temperature set point, allowing for some hysteresis as understood by those skilled in the art, the thermostat controller 62 transmits a COOL control signal over the COOL control line 58. The COOL control signal includes a request that the electrical load 24 perform a cooling function. The COOL control signal is received by the FAU controller 64, which causes the electrical load 24 to receive power and begin to operate. If the electrical load 24 includes a compressor, refrigerant is supplied to an exchanger (not shown) in the FAU 48.

The thermostat controller 62 also typically supplies a FAN control signal to the FAU controller 64 over the FAN control line 54 to cause the circulation fan 66 to force air across the exchanger (not shown) to cool the air and force the cooled air into the supply ducting 50. The supply ducting 50 will then distribute the cooled air through the facility 20. If the space temperature of the facility 20, as sensed by the temperature sensor 60, reaches or becomes lower than the temperature set point stored in the memory (not shown) of the thermostat controller 62, then the thermostat controller 62 ceases to transmit the COOL control signal to the FAU controller 64. The FAU controller 64 then disables the electrical load 24 from receiving power.

A technique for heating the facility 20 is similar to the cooling process described above. In this case, rather than the electrical load 24 being a cooling device, the electrical load 24 would be a heating device such as, for example, a heat-pump system, a water heater, a pool heater, or a furnace. If the sensed space temperature is below a temperature set point, the thermostat controller 62 transmits a HEAT control signal over the HEAT control line 56. The HEAT control signal includes a request that the electrical load 24 perform a heating function. The HEAT control signal is received by the FAU controller 64, which causes the electrical load 24 to receive power and begin to operate.

The thermostat controller 62 will then supply a FAN control signal to the FAU controller 64 to cause the circulation fan 66 to force heated air into the supply ducting 50. The supply ducting 50 will then distribute the heated air through the facility 20. If the space temperature of the facility 20, as sensed by the temperature sensor 60, reaches or becomes higher than the temperature set point, then the thermostat controller 62 stops transmitting the HEAT control signal to the FAU controller 64. The FAU controller 64 then disables the electrical load 24 from receiving power. Consequently, the on and off control of the electrical load 24 by the thermostat controller 62 to maintain a constant space temperature can be modeled by a system having a negative feedback loop such as, for example, in the block diagram of FIG. 2.

Figure 2:
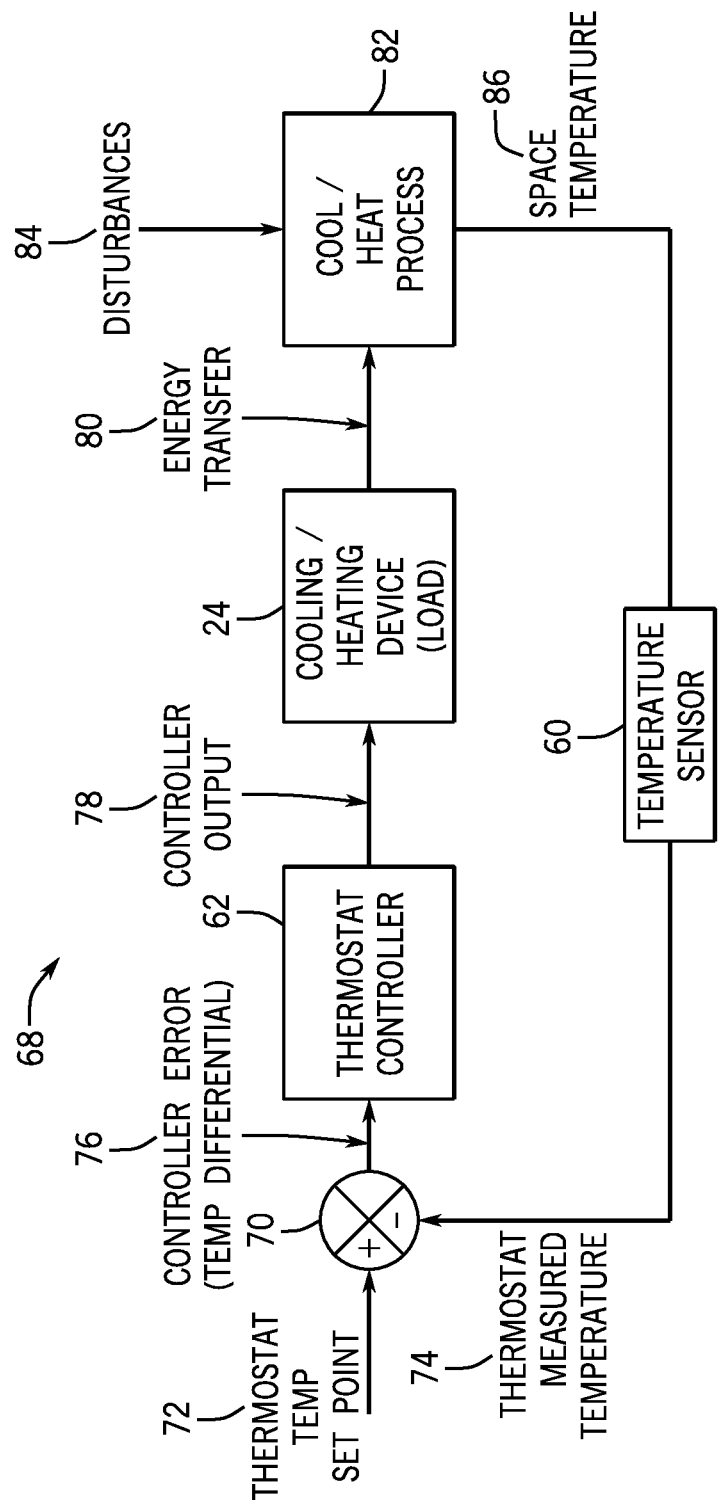
FIG. 2 is a block diagram of a primary negative feedback control system for controlling the HVAC system of FIG. 1, according to an embodiment of the invention.

Referring now to FIG. 2, a block diagram of a primary negative feedback control system 68 for controlling the HVAC system 30 of FIG. 1 is illustrated, according to an embodiment of the invention. At block 70, the thermostat controller 62 compares a temperature set point temperature 72 of the thermostat 62 to an actual or measured space temperature 74 of the facility 20 sensed by the temperature sensor 60. The temperature differential or controller error 76 is used by thermostat controller 62 to determine whether to active the electrical load 24.

If the electrical load 24 is a cooling device and the temperature differential 76 is negative such that the space temperature 74 exceeds the thermostat set point temperature 72, the output 78 of the thermostat controller 62 includes a call for cool or COOL control signal. If the temperature differential 76 is positive or equal to zero, the thermostat controller 62 would not output the COOL control signal. On the other hand, if the electrical load 24 is a heating device and the temperature differential 76 is positive such that the space temperature 74 is below the thermostat set point temperature 72, the output 78 of the thermostat controller 62 includes a call for heat or HEAT control signal. If the temperature differential 76 is negative or equal to zero, the thermostat controller 62 would not output the HEAT control signal.

If the thermostat controller 78 does output either the COOL or HEAT control signal, the electrical device 24 is activated, causes an energy transfer 80 and then a cooling or heating process 82. The cooling or heating process 82 may include the cooling and/or heating of forced air from the circulation fan 66 and the distribution of the forced air through the supply ducting 50, the conditioned space of the facility 20, and the return-air ducting 52. External disturbances 84 may also be introduced into the heating or cooling process. The disturbances may affect the space temperature 86 resulting from the heating and cooling process. Such disturbances may include, for example, energy losses of the facility 20. The temperature sensor 60 then measures the space temperature 86 of the facility 20 affected by the cooling or heating process. This negative feedback cycle continues so that the HVAC system 30 continually strives to maintain a space temperature as close to the thermostat set point temperature 72 as possible.

Figure 3:
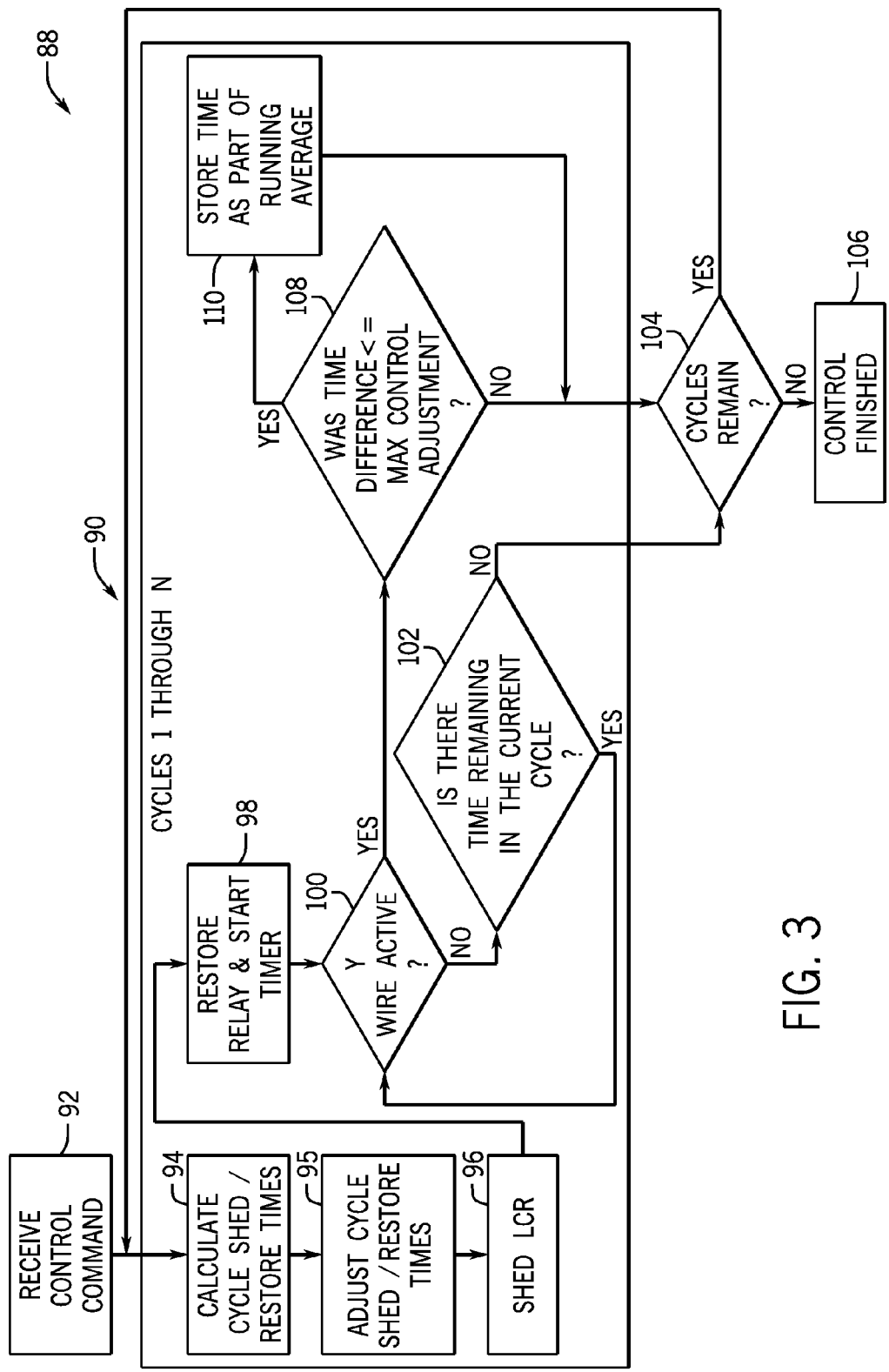
FIG. 3 is a flow chart setting forth exemplary steps of a process for controlling the load control system of FIG. 1, according to an embodiment of the invention.

Referring now to FIG. 3 with reference to FIG. 1, a process or technique 88 for controlling the load control system 26 of FIG. 1 is shown, with the technique 88 being performed by the controller 36 of the load control system 26, according to an embodiment of the invention. The process 88 is described hereinafter under the circumstance when the electrical load 24 is a cooling device and the thermostat 46 is configured to call for cooling from the electrical load 24. However, one of skill in the art will understand that the process 88 may be used in circumstances other than when cooling is desired. For example, the process 88 may be used when the electrical load 24 is a heating device.

In general, the process 88 includes a feedback loop 90 that adjusts or modifies a shed cycle time and a restore cycle time for controlling the LCR 34 of the load control system 26 based on a thermostat delay time of the thermostat 46. The process 88 starts at STEP 92 when the controller 36 receives a control command from the master station 12. The control command includes a time to begin controlling the LCR 34, a number of cycles to control the LCR 34, and a cycle period for each cycle. The control command also includes a commanded shed percentage. In various embodiments, the control command includes a control duration instead of a cycle period, and the controller 36 determines a cycle period based on the commanded control duration and the number of cycles. As an example, for the purpose of illustration, if a control command includes a 4-hour control duration and 8 cycles, the controller 36 may set the cycle period to 30 minutes.

At STEP 94, the controller 36 calculates initial or commanded cycle shed and restore times for each cycle based on the commanded shed percentage and cycle period. At STEP 95, the controller 36 adjusts the cycle shed time and the cycle restore time according to:

$$\begin{aligned}&\text{If } (CmdCycleShedTime > AverageThermostatDelay)\\&NewCycleShedTime = CmdCycleShedTime - AverageThermostatDelay\\&NewCycleRestoreTime =\\&\qquad CmdCycleRestoreTime + AverageThermostatDelay\\&\text{Else}\\&NewCycleShedTime = C\\&NewCycleRestoreTime = CyclePeriod - C,\end{aligned}$$ [Eqn. 1]

where CmdCycleShedTime is the cycle shed time calculated from the commanded cycle percentage, Average ThermostatDelay is an average thermostat delay or delay time, NewCycleShedTime is a new or modified cycle shed time, NewCycleRestoreTime is a new or modified cycle restore time, CmdCycleRestoreTime is the cycle restore time calculated from the commanded cycle percentage and cycle period, C is a constant equal to a predefined cycle shed time of a protection timer of the LCR 34, and CyclePeriod is the cycle period. The average thermostat-induced delay is calculated or determined based on each measured thermostat delay or delay time in each cycle, as further described below.

As shown by the "If" portion of Eqn. 1, the average thermostat delay is used to modify the commanded cycle shed and restore times to produce new cycle shed and restore times. The controller 36 sets the new cycle shed time to the commanded cycle shed time minus the average thermostat delay, meaning that the LCR will not be shed for as long as called for by the control command. The average thermostat delay time is then added to the effective cycle restore time so that the new cycle restore time restores the LCR for a longer period of time than the control command indicates. These adjustments or modifications to the commanded cycle shed and restore times compensate for the thermostat delay. The thermostat controller 62 will not allow power to flow to the electrical load 24 until the thermostat delay has expired, even if the LCR 34 is closed. By adjusting the cycle shed and restore times by the average thermostat delay, the controller 36 counteracts or offsets the thermostat delay. Thus, the average thermostat delay may also be referred to as a compensation time.

However, if the thermostat delay has not been monitored, the average thermostat delay is equal to zero, and the controller 36 sets the new cycle shed and restore times to the commanded cycle shed and restore times. In various embodiments, the controller 36 may also be programmed to not use the average thermostat until the thermostat delay has been measured a certain number of times to establish an accurate average thermostat delay. An average thermostat delay calculated using only a few thermostat delays may not be reliable because the few thermostat delays could be biased toward a short or a long amount of time and would result in an average thermostat delay that is not truly accurate. Another instance in which the average thermostat delay would not be used is when the commanded cycle shed time is less than or equal the average thermostat delay. In that instance, the controller 36 would set the cycle shed time to the predefined cycle shed time and the cycle restore time to the cycle period minus the predefined cycle shed time, as shown by the "Else" portion of Eqn. 1. In various embodiments, the predefined cycle shed time is equal to a relatively short amount of time such as, but not limited to, one (1) second.

After calculating the new cycle shed and restore times, the controller 36 sheds the LCR 34 according to the new cycle shed time at STEP 96. At STEP 98, the controller 36 restores the LCR according to the new cycle restore time and starts a thermostat delay timer. At STEP 100, the controller 36 determines whether the COOL control line or Y wire 58 is active based on a reading from load control line sensor 44. If the COOL control line 58 is not active, the process 88 proceeds to STEP 102. At STEP 102, the controller 36 determines whether there is any time remaining in the current cycle. If time remains in the current cycle, the process 88 loops back to STEP 100 to determine if the COOL control line 58 is active. If no time remains in the current cycle, the process 88 proceeds to STEP 104. At STEP 104, the controller 36 determines if there are any more cycles in the control command. If any cycles remain, the process 88 loops back to STEP 94 and new cycle shed and restore times are calculated. If no cycles remain, the process 88 proceeds to STEP 106, where the controller 36 finishes controlling the LCR 34 based on the control command.

Referring back to STEP 100, if the controller 36 determines that the Y wire 58 is active, the controller 36 stops the thermostat delay timer, and the process 88 proceeds to STEP 108. At STEP 108, the controller 36 determines whether the thermostat delay obtained from the thermostat delay timer is less than or equal to a maximum control adjustment time. If the thermostat delay time is greater than the maximum control adjustment time, the process 88 proceeds to STEP 104 to determine if any cycles remain in the control command. The maximum control adjustment time is used to differentiate between one circumstance when the thermostat 46 actively calls for cool within the maximum adjustment time after the LCR 34 has been restored and another circumstance when the thermostat 46 did not need to call for cool within the maximum adjustment time because the temperature sensed by the temperature sensor 60 of the thermostat 46 was already at or below a temperature set point of the thermostat controller 62. If the thermostat delay is greater than the maximum control adjustment time, the controller 36 will not use the thermostat delay time as part of the average thermostat delay because the thermostat delay will have too great of an effect on the average thermostat delay.

Referring back to STEP 108, if the thermostat delay is less than or equal to the maximum control adjustment time, the process 88 proceeds to STEP 110. At STEP 110, the controller 36 stores the thermostat delay as part of the average thermostat delay. In other words, the controller 36 calculates a new average thermostat delay or delay time based on the thermostat delay. After calculating the new average thermostat-induced delay, the process 88 proceeds to STEP 104. If the controller 36 determines that cycles remain in the cycle period at STEP 104, the process 88 returns to STEP 94, where the cycle shed and restore times are recalculated in case a new control command has been received. The new average thermostat delay time may then be used to adjust the recalculated cycle shed and restore times to better compensate for the thermostat delay.

Figure 4:
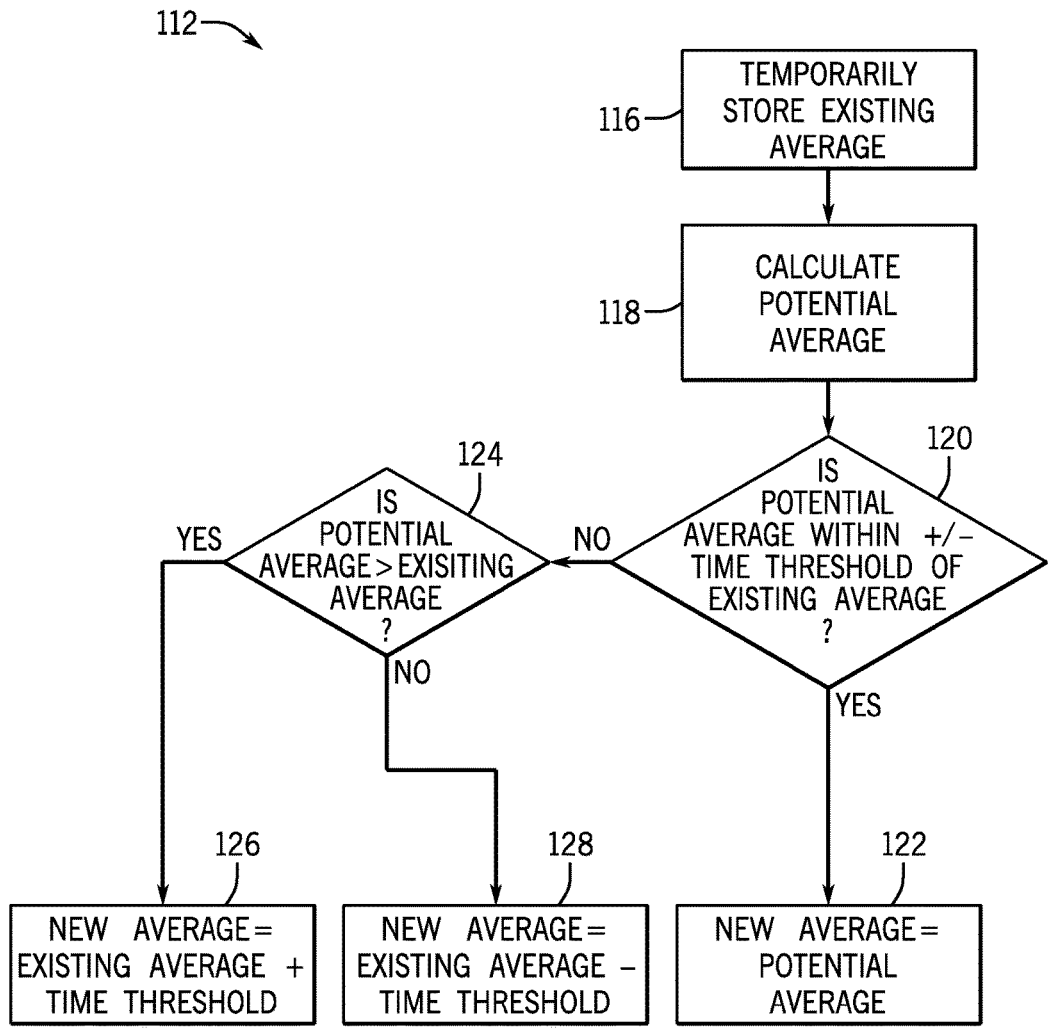
FIG. 4 is a flow chart setting forth exemplary steps of a process usable in connection with the process of FIG. 3 for storing a thermostat delay time as part of an average thermostat delay time, according to an embodiment of the invention.

Referring now to FIG. 4 with reference to FIGS. 1 and 3, a technique 112 for storing a thermostat delay as part of an average thermostat delay is shown, with the technique 112 being performed by the controller 36 of the load control system 26 of FIG. 1, according to an embodiment of the invention. The process 112 may be used at STEP 110 of the process 88 of FIG. 3. The process 112 begins at STEP 116, where the controller 36 temporarily stores an old or existing average thermostat delay. At STEP 118, the controller 36 calculates a potential or possible average thermostat delay or delay time according to:

$$\text{PotentialAverage} = (1-x)*\text{ExistingAverage} + x*\text{ThermostatDelayTime} \quad [\text{Eqn. 2}],$$

where PotentialAverage is the potential new average thermostat-induced delay, x is a predefined constant selected to define the weighting between the existing average thermostat delay and the thermostat delay, ExistingAverage is the old or existing average thermostat delay time, and ThermostatDelayTime is the determined thermostat delay. Thus, the calculated potential average thermostat delay is a weighted average of the existing average thermostat delay and the thermostat delay. In preferred embodiments, the constant, x, is selected to be less than 0.5 so that the existing average thermostat delay has a greater weight than the thermostat delay based on the presumption that the existing average thermostat delay is more accurate than the single value of the thermostat delay. However, constant, x, may be any value within the range 0<x<1 in alternative embodiments. As an example, in various embodiments, the constant, x, is equal to one-eighth so that that the existing average thermostat delay is weighted at seven-eighths of the potential average thermostat delay and the thermostat delay is weighted at one-eighth of the potential average thermostat delay. The weighting of seven-eighths for the existing average thermostat delay and one-eighths for the thermostat delay may be chosen for convenience when using a binary processor.

At STEP 120, the controller 36 determines whether the potential average thermostat delay is within a time threshold or threshold time of the existing average thermostat delay. That is, the controller determines if the potential average is within a range of time from the existing average thermostat delay minus the value of the time threshold and the existing average thermostat delay plus the value of the time threshold. The time threshold represents a maximum amount of time that a new average thermostat delay should change from the existing average thermostat delay so as not to significantly affect how the controller 36 controls the LCR 34. Otherwise, a single outlying thermostat delay that is significantly higher or lower than the existing average thermostat delay could skew the average thermostat delay. Then, the calculation of the new average thermostat delay may not be as accurate. In various embodiments, the time threshold is equal to 60 seconds so that the controller 36 determines if the potential average thermostat delay is within 60 seconds of the existing average thermostat delay. However, the time threshold may be defined as less than or greater than 60 seconds in alternative embodiments. If the potential average thermostat delay is within the time threshold of the existing average thermostat delay, the process 112 proceeds to STEP 122. At STEP 122, the controller 36 sets a new average thermostat delay time to the potential average thermostat delay time.

Referring back to STEP 120, if the potential average thermostat delay is more or less than the time threshold from the existing average thermostat delay, the process 112 proceeds to STEP 124. At STEP 124, the controller 36 determines whether the potential average thermostat delay is greater than the existing average thermostat delay. If the potential average thermostat delay is greater than the existing average thermostat delay time, the process 112 proceeds to STEP 126. At STEP 126, the controller 36 sets a new average thermostat delay to the existing average thermostat delay time plus the value of the time threshold. Referring back to STEP 124, if the potential average thermostat delay time is less than the existing average thermostat delay time, the process 112 proceeds to STEP 128. At STEP 128, the controller 36 sets a new average thermostat delay time to the existing average thermostat delay time minus the value of the time threshold.

An example calculation following the process 88 of FIG. 3 and the process 112 of FIG. 4. follows below. The example calculation is presented for the purposes of illustration only and should not be seen as limiting the processes 88, 112 to the particular circumstances contained therein. Also, the example calculation is presented under the assumption that the processes 88, 112 have been running long enough to establish an accurate average thermostat delay time.

The example control command received by the master station 12 of FIG. 1 includes a 67% cycling command and eight (8) cycles, each having a 30-minute cycle period. Thus, the controller 36 of the load control system 26 should shed the LCR 34 for 20 minutes and restore the LCR for 10 minutes. The maximum control adjustment time used in the process 88 of FIG. 3 is set to 10 minutes, and the time threshold used in the process 112 of FIG. 4 is set to 60 seconds. The constant, x, in Eqn. 2 is equal to one-eighth. The current average thermostat delay time is equal to 5 minutes, 12 seconds. Based on the current average thermostat delay, the effective cycle percentage is approximately equal to 80%, as opposed to the desired 67%. However, using the process 88, new cycle shed and restore times are calculated at STEP 95.

According to Eqn. 1 of STEP 95, the first step is to determine whether the commanded cycle shed time is greater than the average thermostat delay time. In this case, the 20-minute commanded cycle shed time is greater than the 5-minute, 12-second average thermostat delay time. The next step is to subtract the average thermostat delay time from the cycle shed time and add the average thermostat delay time to the cycle restore time. Thus, the new cycle shed time is equal to 20 minutes minus 5 minutes, 12 seconds for a total of 14 minutes, 48 seconds, and the new cycle restore time is equal to 10 minutes plus 5 minutes, 12 seconds for a total of 15 minutes, 12 seconds. Based on the new cycle shed and restore times, the cycle percentage is now 49.3%, and the controller 36 sheds the LCR 34 accordingly at STEP 96 of the process 88. However, the thermostat delays cause the cycle percentage to reach the commanded 67% cycling.

Once the shed period at STEP 96 of the process 88 of FIG. 3 ends and the LCR 34 is restored at STEP 98 of the process 88, the thermostat delay timer is started, and the controller 36 monitors whether the Y wire is active at STEP 100 of the process 88. In this case, the Y wire becomes active after 5 minutes, 25 seconds, which is less than the 10-minute maximum control adjustment time at STEP 108 of the process 88. A new average thermostat delay time is calculated at STEP 110 of the process 88 according to the process 112 of FIG. 4. At STEP 116 of the process 112, the existing average thermostat delay time of 5 minutes, 12 seconds is temporarily stored. At STEP 118 of the process 112, a potential average thermostat delay is calculated according to Eqn. 2:

$$\tfrac{7}{8} \times 5 \text{ Minutes}, 12 \text{ Seconds} + \tfrac{1}{8} \times 5 \text{ Minutes}, 25 \text{ Seconds} = 5 \text{ Minutes}, 13 \text{ Seconds} \quad \text{[Eqn. 3]}.$$

Thus, according to Eqn. 3, the potential average thermostat delay is 5 minutes, 13 seconds. This potential average thermostat delay of 5 minutes, 13 seconds is within the time threshold of 60 seconds of the existing average thermostat delay time of 5 minutes, 12 seconds at STEP 120 of the process 112. The process 112 then proceeds to store the potential average thermostat delay time of 5 minutes, 13 seconds as the new average thermostat delay time. The new average thermostat delay time of 5 minutes, 13 seconds may now be used to calculate new cycle shed and restore times at STEP 95 of the process 88 of FIG. 3 if the controller 36 determines that cycles remain in the control command at STEP 104 of the process 88. Thus, the example calculation described above shows how the process 88 and the process 112 may be used to compensate for the thermostat delay time so that the HVAC system of the facility 20 of FIG. 1 may receive the desired amount of control.

Beneficially, embodiments of the invention thus provide a load control system for controlling power to a thermostat of an HVAC system of a facility. The load control system includes a controller that controls an LCR according to data received from a load control line sensor and a control command from a master station. The controller compensates for thermostat delays incorporated into the thermostat by calculating commanded cycle shed and restore times from a commanded cycle percentage dictated by the control command. The controller then calculates an average thermostat delay time based on measured thermostat delay times and adjusts the commanded cycle shed and restore times by the average thermostat delay time. The adjustment to the commanded cycle shed and restore times effectively offsets the thermostat delays such that the HVAC system is permitted to operate for the entire duration dictated by the control command, rather than a reduced time period caused by the thermostat delay.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the present invention, a system for controlling a load control relay (LCR) for a heating, ventilating, and air conditioning (HVAC) system includes a controller. The controller is programmed to measure a thermostat delay time of a thermostat of the HVAC system, the thermostat delay time including an amount of time between restoring the LCR and receiving power in a load control line coupled between the thermostat and a load of the HVAC system. The controller is further programmed to calculate a new cycle shed time and a new cycle restore time based on the measured thermostat delay time, wherein the new cycle shed time and the new cycle restore time compensate for the thermostat delay time. The controller is also programmed to control the LCR according to the new cycle shed time and new cycle restore time.

According to another embodiment of the present invention, a method of controlling a load control relay (LCR) for a heating, ventilating, and air conditioning (HVAC) system having a thermostat and a load control line coupling the thermostat to a load includes measuring a thermostat-induced delay between a time the LCR is restored and a time power is received on the load control line. The method additionally includes defining a compensation time to offset the thermostat-induced delay and calculating a new cycle shed time and a new cycle restore time based on the compensation time. The method further includes controlling the LCR according to the new cycle shed time and the new cycle restore time.

According to yet another embodiment of the present invention, a load control system for selectively supplying power to a thermostat of a heating, ventilating, and air conditioning (HVAC) system includes a load control relay (LCR) coupleable to the HVAC system. The load control system also includes a sensor configured to sense whether a load control line for a load of the HVAC system is active. The load control system additionally includes a communication system capable of communicating with a master station to receive a control command including a shed percentage and one of a control duration and a cycle period for controlling the LCR. The load control system further includes a controller for selectively controlling the LCR according to the control command. The controller programmed to calculate a cycle shed time and a cycle restore time based on the control command and 1 control the LCR according to the cycle shed time and the cycle restore time. In addition, the controller is programmed to determine a thermostat delay between a restore time of the LCR and a time the sensor senses that the load control line is active and modify the cycle shed time and the cycle restore time based on the thermostat delay to counteract the thermostat delay. Furthermore, the controller is programmed to control the LCR according to the modified cycle shed time and the modified cycle restore time.

The present invention has been described in terms of the preferred embodiment, and it is recognized that equivalents, alternatives, and modifications, aside from those expressly stated, are possible and within the scope of the appending claims.

What is claimed is:

1. A system for controlling a load control relay (LCR) for a heating, ventilating, and air conditioning (HVAC) system, the system comprising a controller programmed to:
   measure a thermostat delay time of a thermostat of the HVAC system, the thermostat delay time comprising an amount of time between restoring the LCR and receiving power in a load control line coupled between the thermostat and a load of the HVAC system;
   calculate a new cycle shed time and a new cycle restore time based on the measured thermostat delay time, wherein the new cycle shed time and the new cycle restore time compensate for the thermostat delay time; and
   control the LCR according to the new cycle shed time and new cycle restore time.

2. The system of claim 1 wherein the controller is further programmed to:
   receive a control command for controlling the LCR, the control command comprising a shed percentage and one of a cycle period and a control duration;
   if the control command includes a control duration, determine a cycle period based on the control duration;
   calculate an initial cycle shed time and an initial cycle restore time based on the cycle period and the shed percentage; and
   measure the thermostat delay time during the initial cycle restore time.

3. The system of claim 2 wherein, if the initial cycle shed time is greater than an average thermostat delay time, the controller is programmed to:
   calculate the new cycle shed time by subtracting the average thermostat delay time from the initial cycle shed time; and calculate the new cycle restore time by adding the average thermostat delay time to the initial cycle restore time.

4. The system of claim 3 wherein, if the initial cycle shed time is less than or equal to the average thermostat delay time, the controller is programmed to:
set the new cycle shed time to a predefined cycle shed time; and
set the new cycle restore time to the cycle period minus the predefined cycle shed time.

5. The system of claim 1 wherein the controller is programmed to sense the thermostat delay time of the thermostat by:
starting a thermostat delay timer simultaneously with restoring the LCR;
sensing if the load control line is active; and
if the load control line is active, stopping the thermostat delay timer.

6. The system of claim 5 wherein the controller is further programmed to sense the thermostat delay time of the thermostat by:
if the load control line is not active:
determining whether any time remains in a current cycle for controlling the LCR;
if time remains in the current cycle, continuing to sense if the load control line is active; and
if no time remains in the current cycle:
ceasing to sense if the load control line is active;
determining if any cycles remain in a current control command for controlling the LCR;
if cycles remain in the current control command, continue controlling the LCR; and
if no cycles remain in the current control command, ceasing to control the LCR.

7. The system of claim 1 wherein, if the thermostat delay time is greater than a maximum control adjustment time, the controller is programmed to calculate the new cycle shed time and the new cycle restore time based on an existing average thermostat delay time, the existing average thermostat delay time comprising an average amount of time between restoring the LCR and receiving power in the load control line previous to the thermostat delay time.

8. The system of claim 1 wherein the controller is further programmed to:
store the thermostat delay time as part of an average thermostat delay time; and
calculate the new cycle shed time and the new cycle restore time based on the average thermostat delay time.

9. The system of claim 8 wherein the controller is programmed to store the thermostat delay time as part of the average thermostat delay time by:
temporarily storing an existing average thermostat delay time;
calculating a potential average thermostat delay time based on the existing average thermostat delay time and the thermostat delay time;
if the potential average thermostat delay time is within a time threshold different from the existing average thermostat delay time, setting the average thermostat delay time to the potential average thermostat delay time; and
if the potential average thermostat delay time is different from the existing average thermostat delay time by an amount of time beyond the time threshold, setting the average thermostat delay time to one of the existing average thermostat delay time minus the time threshold and the existing average thermostat delay time plus the time threshold.

10. A method of controlling a load control relay (LCR) for a heating, ventilating, and air conditioning (HVAC) system having a thermostat and a load control line coupling the thermostat to a load, the method comprising:
measuring a thermostat-induced delay between a time the LCR is restored and a time power is received on the load control line;
defining a compensation time to offset the thermostat-induced delay;
calculating a new cycle shed time and a new cycle restore time based on the compensation time; and
controlling the LCR according to the new cycle shed time and the new cycle restore time.

11. The method of claim 10 wherein defining the compensation time comprises:
storing an existing average thermostat-induced delay between a time the LCR is restored and a time power is received on the load control line;
calculating a potential compensation time based on the thermostat-induced delay and the existing average thermostat-induced delay;
if the potential compensation time is within a time threshold of the existing average thermostat-induced delay, setting the compensation time to the potential compensation time;
if the potential compensation time exceeds the existing average thermostat-induced delay by more than the time threshold, setting the compensation time to the existing average thermostat-induced delay plus the time threshold; and
if the potential compensation time is below the existing average thermostat-induced delay by more than the time threshold, setting the compensation time to the existing average thermostat-induced delay minus the time threshold.

12. The method of claim 11 further comprising calculating the potential compensation time as a weighted average of the thermostat-induced delay and the existing average thermostat-induced delay.

13. The method of claim 10 wherein calculating the new cycle shed time comprises subtracting the compensation time from an initial cycle shed time of a control command for controlling the LCR; and
wherein calculating the new cycle restore time comprises adding the compensation time to an initial cycle restore time of the control command.

14. The method of claim 10 further comprising comparing the thermostat-induced delay to a maximum control adjustment time; and
wherein, if the thermostat-induced delay is greater than the maximum control adjustment time, defining the compensation time comprises setting the compensation time to an existing average thermostat-induced delay, the existing average thermostat-induced delay comprising a time between when the LCR is restored and power is received on the load control line.

15. The method of claim 10 further comprising ceasing control of the LCR if the load control line stays inactive for a predetermined time, no time remains in a cycle period of a current cycle for controlling the LCR, and no cycles remain in a control command for controlling the LCR.

16. A load control system for selectively supplying power to a thermostat of a heating, ventilating, and air conditioning (HVAC) system, the load control system comprising:
a load control relay (LCR) coupleable to the HVAC system;

a sensor configured to sense whether a load control line for a load of the HVAC system is active;

a communication system capable of communicating with a master station to receive a control command comprising a shed percentage and one of a control duration and a cycle period for controlling the LCR; and a controller for selectively controlling the LCR according to the control command, the controller programmed to:

calculate a cycle shed time and a cycle restore time based on the control command;

control the LCR according to the cycle shed time and the cycle restore time;

determine a thermostat delay between a restore time of the LCR and a time the sensor senses that the load control line is active;

modify the cycle shed time and the cycle restore time based on the thermostat delay to counteract the thermostat delay; and control the LCR according to the modified cycle shed time and the modified cycle restore time.

17. The load control system of claim 16 wherein the controller determines the thermostat delay by:

starting a timer upon restoring the LCR; and stopping the timer when the sensor senses a current on the load control line.

18. The load control system of claim 16 further programmed to calculate an average thermostat delay based on the thermostat delay; and modify the cycle shed and restore times based on the average thermostat delay.

19. The load control system of claim 18 wherein the controller is further programmed to calculate the average thermostat delay as a weighted average of an existing average thermostat delay and the thermostat delay.

20. The load control system of claim 19 wherein the controller is programmed to modify the average thermostat delay based on a comparison to the existing average thermostat delay.

\* \* \* \* \*